2 Sheets—Sheet 1.

D. S. FISHER.
Seed-Planter.

No. 23,913. Patented May 10, 1859.

Witnesses.
C. M. Alexander

Inventor:
D. S. Fisher

D. S. FISHER.
Seed-Planter.

No. 23,913.

Patented May 10, 1859.

Witnesses:
C. M. Alexander.

Inventor:
D. S. Fisher.

UNITED STATES PATENT OFFICE.

D. S. FISHER, OF MAUCKPORT, INDIANA.

IMPROVEMENT IN SEED-PLANTERS.

Specification forming part of Letters Patent No. 23,913, dated May 10, 1859.

*To all whom it may concern:*

Be it known that I, DAVID S. FISHER, of Mauckport, in the county of Harrison and State of Indiana, have invented certain new and useful Improvements in Seeding-Machines; and I do hereby declare that the following is a full, clear, and exact description of the same, reference being had to the accompanying drawings, and to the letters of reference marked thereon.

Figures 1, 4:
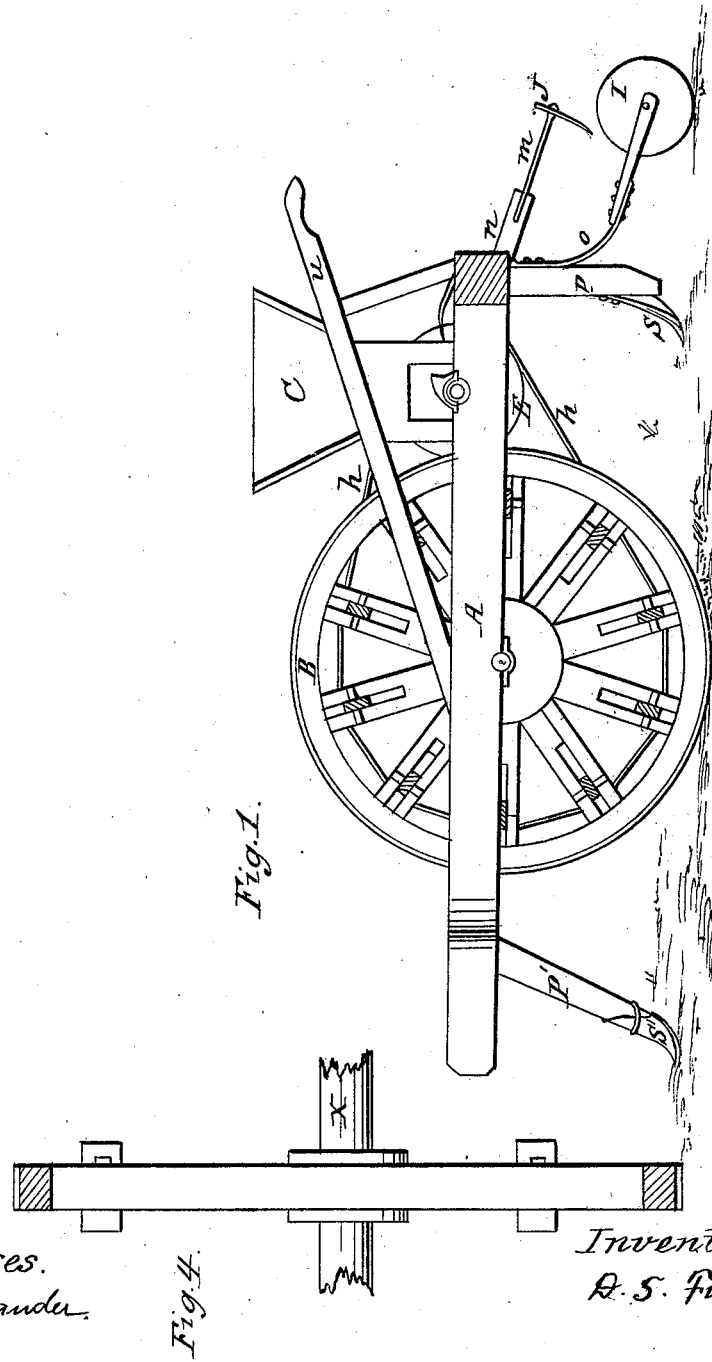
Figure 3:
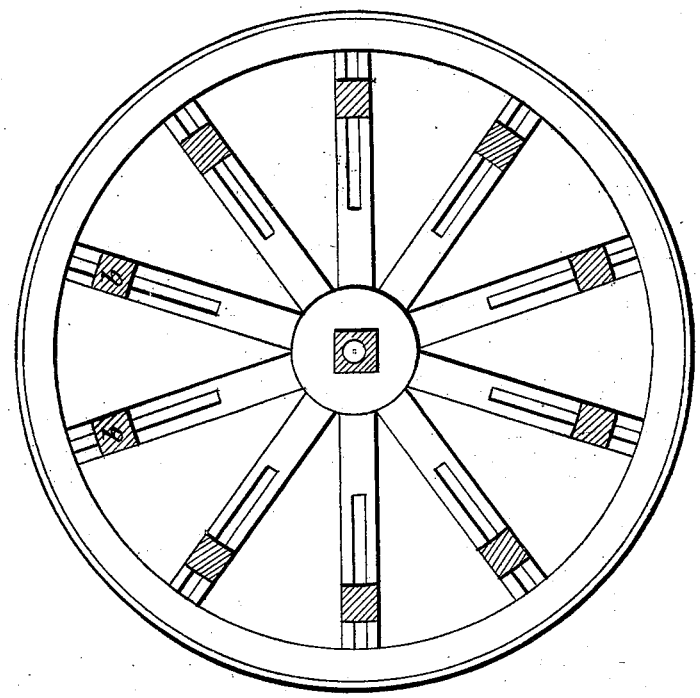
Figure 5:
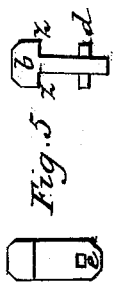
Figure 2:
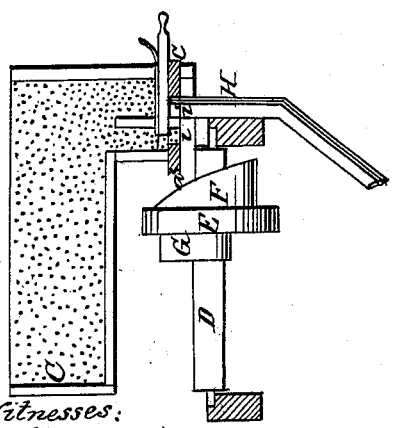

In the annexed drawings, Figure 1 is a side elevation. Fig. 2 represents a section of the seed box and slides. Fig. 3 is a detached view of the driving-wheel. Fig. 4 is a section of the driving-wheel. Fig. 5 is a view of one of the pieces which form an expanding and contracting drum or wheel for the purpose of driving the seed apparatus and hoe.

In the figures, A represents a frame, in which is secured a driving-wheel, B, said wheel being attached to shaft $x$. This wheel B is either provided with double spokes or the spokes are slotted, as represented, from the rim toward the center. Though the slots in the spoke pass pieces $b\,b\,b$, which are disconnected segments of the wheel or drum. These pieces or segments are provided with shoulders $z\,z$, which fit up against the spokes on one side, and with a pin, $d$, which passes through a hole, $e$, and fits up against the spoke on the other side. The pins $d$ are made wedge form, and thus serve to tighten the segments on the spokes of the driving-wheel B.

C represents the seed-hopper, which is placed on the rear of the frame A. Under the seed-hopper, and in the frame A, is placed a shaft, D, to which shaft is secured a pulley, E, and two cams, G and P. A band, $h$, passes around the segments on the driving-wheel, and then around pulley E, for the purpose of giving motion to the shaft D when the machine is in operation.

$a$ represents the seed-slide, which shoves into the bottom of the hopper. It has two apertures, $i\;i'$, in it for the admission and discharge of grain. One end of this slide is operated upon by means of the cam F, for the purpose of moving it back and carrying the grain to the discharge-spout H. The slide is returned to its position for receiving the grain by means of a spring, which operates upon its other end.

$c$ represents a cut-off slide, which works above the slide $a$, said slide being stationed at any desired point for the purpose of shutting off more or less seed from the slide $a$, as circumstances may require.

P′ represents an arm extending toward the ground from the under side of the front part of the frame, to which is attached a plow or cultivator tooth, $s'$.

P represents a corresponding arm at the rear of the frame, which is provided with a like tooth, $s$.

I represents a roller, which rolls upon the ground behind the machine. Said roller is attached to the frame by means of springs at each end, so that it may be allowed to pass freely over obstructions which may lie in its way.

J represents a hoe, which is attached to a spring, $m$, said spring being secured to an arm, $n$, which arm is so secured to the frame that its front end may be operated upon by the cam G on shaft D. The cam depresses the forward end of the arm each time as it passes around, and the hoe-arm $n$, being secured upon a pivot or rod so that it will turn, plays up and down, and serves to cover the grain while the machine is in operation.

When the machine is set in motion the band $h$ on the driving-wheel B communicates motion to pulley E, and thus to shaft D, the cams, the seed-slide, and the hoe. It is evident that the faster the shaft D turns the more rapidly the seed will pass out from the hopper; and it is also evident that the larger the diameter of the wheel formed by the segments the faster said shaft D will turn. So I regulate the discharge of seed by means of the segmental wheel on wheel B. By reducing it in size and taking up the band correspondingly the motion of the seed-slide is diminished and a much smaller quantity of seed may be sown.

Having thus fully described my invention, what I claim as new, and desire to secure by Letters Patent, is—

The combination and arrangement of the spring-hoe J and adjustable spring-roller I with the seeding and regulating apparatus herein described, in the manner and for the purpose herein set forth.

DAVID S. FISHER.

Witnesses:
 JOHN P. SONNER,
 JAMES H. MILLER.